(12) United States Patent
Keating et al.

(10) Patent No.: US 9,412,330 B2
(45) Date of Patent: *Aug. 9, 2016

(54) CONVERSION OF MULTIMEDIA DATA STREAMS FOR USE BY CONNECTED DEVICES

(75) Inventors: Stephen J. Keating, Sunnyvale, CA (US); Alexander Peysakhovich, San Jose, CA (US); Hung Yu Hsieh, Sunnyvale, CA (US); David Noel Babbage, II, Saratoga, CA (US); Jiong Huang, Sunnyvale, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 550 days.

This patent is subject to a terminal disclaimer.

(21) Appl. No.: 13/198,584

(22) Filed: Aug. 4, 2011

(65) Prior Publication Data

US 2012/0236949 A1 Sep. 20, 2012

Related U.S. Application Data

(60) Provisional application No. 61/453,073, filed on Mar. 15, 2011.

(51) Int. Cl.
*H04N 7/12* (2006.01)
*H04N 7/015* (2006.01)
*G09G 5/00* (2006.01)
(Continued)

(52) U.S. Cl.
CPC ............ *G09G 5/003* (2013.01); *H04L 65/605* (2013.01); *H04N 21/4122* (2013.01); *H04N 21/43635* (2013.01); *H04N 21/43637* (2013.01); *H04N 21/440218* (2013.01); *G09G 3/003* (2013.01); *G09G 5/005* (2013.01); *G09G 5/006* (2013.01); *G09G 2370/047* (2013.01); *G09G 2370/12* (2013.01); *G09G 2370/20* (2013.01); *H04L 65/1059* (2013.01); *H04N 21/434* (2013.01)

(58) Field of Classification Search
CPC combination set(s) only.
See application file for complete search history.

(56) References Cited

U.S. PATENT DOCUMENTS 5,534,883 A * 7/1996 Koh ..................... G06F 3/1475
345/3.2
6,466,220 B1 10/2002 Cesana et al.
(Continued)

FOREIGN PATENT DOCUMENTS

JP 2006-121553 A 5/2006
JP 2008-042645 A 2/2008
(Continued)

OTHER PUBLICATIONS

"DisplayPort Ver. 1.2 Overview," DisplayPort Developer Conference, Taipei, Dec. 6, 2010, 33 pages.
(Continued)

*Primary Examiner* — Dave Czekaj
*Assistant Examiner* — Tyler W Sullivan
(74) *Attorney, Agent, or Firm* — Fenwick & West LLP

(57) ABSTRACT

Embodiments of the invention are generally directed to conversion of multimedia data streams for use by connected devices. An embodiment of a method for processing data includes receiving a data stream in a first multimedia data format at a first device, and inserting a replacement video portion into the received data stream to generate a modified multimedia data stream in a second multimedia data format. The modified data stream is provided to a second device coupled to the first device.

18 Claims, 6 Drawing Sheets

(51) Int. Cl.
*H04N 21/41* (2011.01)
*H04N 21/4363* (2011.01)
*H04N 21/4402* (2011.01)
*H04L 29/06* (2006.01)
*H04N 21/434* (2011.01)
*G09G 3/00* (2006.01)

(56) References Cited

U.S. PATENT DOCUMENTS

| | | | | |
|---|---|---|---|---|
| 7,978,376 | B2 * | 7/2011 | Divine | G06F 1/1626 345/418 |
| 8,379,145 | B2 * | 2/2013 | Choi | G09G 5/02 348/441 |
| 8,537,201 | B2 * | 9/2013 | Choi | H04N 13/004 348/43 |
| 8,553,150 | B2 * | 10/2013 | Sawada | H04N 5/57 348/571 |
| 8,583,841 | B2 * | 11/2013 | Zeng | H03L 7/0807 710/21 |
| 9,167,282 | B2 * | 10/2015 | Tran | H04N 21/43635 |
| 2004/0199564 | A1 * | 10/2004 | Chih-Chiang | H04N 21/4341 709/200 |
| 2006/0061517 | A1 | 3/2006 | Jolly et al. | |
| 2006/0209890 | A1 * | 9/2006 | MacMullan | H04L 63/0428 370/468 |
| 2006/0238524 | A1 * | 10/2006 | Hsieh | G06F 3/14 345/204 |
| 2008/0155230 | A1 * | 6/2008 | Robbins | H04N 21/2381 712/1 |
| 2008/0285576 | A1 * | 11/2008 | Teener | H04L 12/2805 370/403 |
| 2009/0324201 | A1 * | 12/2009 | Sakai | H04N 9/8205 386/281 |
| 2010/0091180 | A1 * | 4/2010 | Liu | G06F 3/14 348/441 |
| 2010/0182402 | A1 * | 7/2010 | Nakajima | G09G 5/006 348/42 |
| 2010/0289812 | A1 * | 11/2010 | Kobayashi | G09G 5/02 345/590 |
| 2011/0012990 | A1 * | 1/2011 | Broberg | H04N 13/0029 348/43 |
| 2011/0141351 | A1 * | 6/2011 | Yan | G09G 5/006 348/445 |
| 2011/0149032 | A1 * | 6/2011 | Choi | H04N 13/0051 348/43 |
| 2011/0157308 | A1 * | 6/2011 | Mansho | H04N 13/0051 348/43 |
| 2011/0228932 | A1 * | 9/2011 | Iwamoto | H04N 21/2347 380/205 |
| 2012/0249736 | A1 * | 10/2012 | Barrett | H04N 13/0029 348/43 |
| 2013/0127990 | A1 * | 5/2013 | Lin | H04N 13/0029 348/43 |
| 2013/0326576 | A1 * | 12/2013 | Zhang | H04N 21/21805 725/133 |

FOREIGN PATENT DOCUMENTS

| | | |
|---|---|---|
| JP | 2008-282296 A | 11/2008 |
| JP | 2009-289182 A | 12/2009 |
| JP | 2010-004467 A | 1/2010 |
| JP | 2010-041647 A | 2/2010 |
| JP | 2010147542 A * | 7/2010 |
| KR | 10-2009-0092641 | 9/2009 |
| WO | WO 2008035142 A1 * | 3/2008 |
| WO | WO-2010-084436 | 7/2010 |
| WO | WO-2010-095081 | 8/2010 |
| WO | WO 2011/002141 A1 | 1/2011 |
| WO | WO 2011/013036 A1 | 2/2011 |
| WO | WO 2012116465 A1 * | 9/2012 |

OTHER PUBLICATIONS

"High-Definition Multimedia Interface Specification Version 1.3," HDMI Licensing LLC, Jun. 22, 2006, 237 pages.
International Search Report and Written Opinion of the International Searching Authority in International Patent Application No. PCT/US2012/027084, 10 pages.
European Extended Search Report, European Application No. 12789035.8, Jul. 25, 2014, 6 pages.
Japanese Office Action, Japanese Application No. 2013-558031, Oct. 6, 2015, 5 pages.
European Examination Report, European Application No. 12789035.8, Feb. 17, 2016, 7 pages.

* cited by examiner

CONVERSION OF MULTIMEDIA DATA STREAMS FOR USE BY CONNECTED DEVICES

RELATED APPLICATIONS

This application is related to and claims priority to U.S. Provisional Patent Application No. 61/453,073, filed Mar. 15, 2011, the entire contents of which are hereby incorporated by reference.

TECHNICAL FIELD

Embodiments of the invention generally relate to the field of multimedia processing and, more particularly, conversion of multimedia data streams for use by connected devices.

BACKGROUND

Multimedia data, including video, audio, and other data, may be transmitted in varying formats. In addition to many legacy formats, newer formats may include HDMI™ (High-Definition Multimedia Interface) formats supported by the High-Definition Multimedia Interface Specification Version 1.4a (Mar. 4, 2010), including three-dimensional (3D) multimedia video, allowing for presentation of 3D video on a television or other display, and data transmitted using a supported 300 MHz video mode, and formats supported by High-Definition Multimedia Interface Specification Version 1.3 (Jun. 22, 2006), including Deep Color (referring to color represented by 30 or more bits per pixel).

However, a presentation device, such as a television unit, that utilizes such multimedia data formats may be connected to one or more connected downstream devices or systems (which are referred to here generally as connected devices) that receive multimedia data via the presentation device. Such connected devices may include installed or legacy devices, including existing HDMI connected devices, that are incapable of accepting a new multimedia signal format received by the presentation device because such devices were not designed to be compatible to the new signal format.

Because of this multimedia signal format incompatibility, devices that could utilize a portion of a signal, such as a device that would utilize the audio portion of a multimedia signal, commonly will reject the entire multimedia signal. For example, a legacy HDMI compatible device that is utilized for presentation of the audio portion of a multimedia signal will reject a 3D HDMI signal because the legacy HDMI device will not recognize the 3D signal format.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Figure 1:
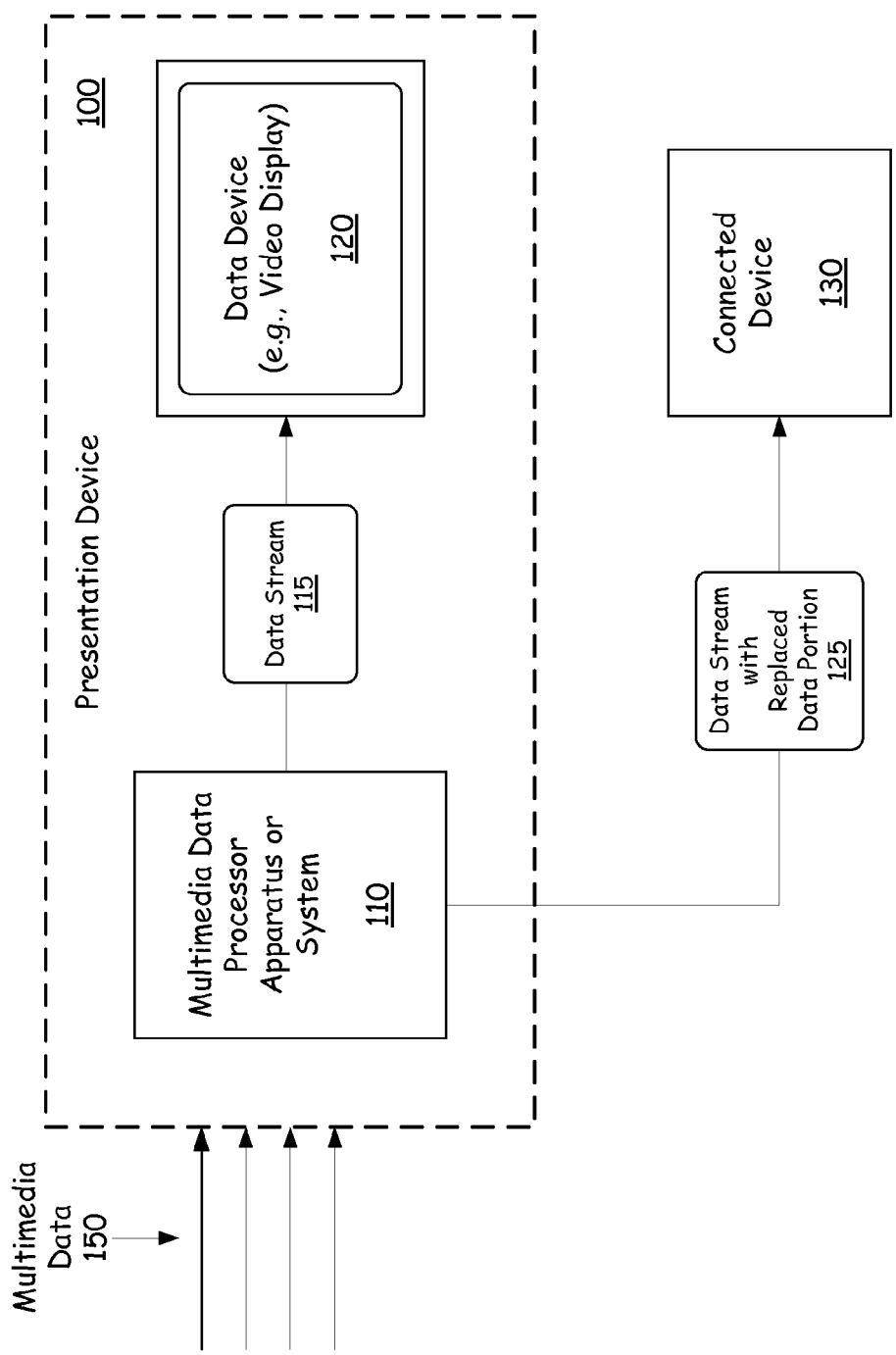
FIG. 1 is an illustration of a system for conversion of multimedia data stream format.

Embodiments of the invention are generally directed to conversion of multimedia data streams for use by connected devices.

In a first aspect of the invention, a method for processing data includes receiving a data stream in a first multimedia data format at a first device, and inserting a replacement data portion into the received data stream to generate a modified multimedia data stream in a second multimedia data format. The modified data stream is provided to a second device coupled to the first device.

In a second aspect of the invention, an apparatus includes one or more ports for the reception of multimedia data, including reception of a first data stream in a first multimedia data format. The apparatus further includes a first transmitter for transmitting the first data stream for presentation, and a second transmitter for transmitting a second data stream to a connected device, where the second data stream is either the received first data stream or a modified version of the received first data stream in a second multimedia data format, the apparatus generating the modified data stream, the generation of the modified data stream including inserting a replacement data portion in the received data stream.

DETAILED DESCRIPTION

Embodiments of the invention are generally directed to conversion of multimedia data streams for use by connected devices.

In some embodiments, a method, apparatus, or system provides for receiving a data stream, and modifying the data stream to be compatible with connected devices that are incompatible with the format of the received data stream. In some embodiments, an apparatus, system, or method operates to receive an input data stream in a first multimedia data format, and insert a replacement data portion to generate a second data stream in a second multimedia data format for utilization by a connected device. In some embodiments, the replacement data portion may be a video, audio, control, metadata, or other data portion.

In some embodiments, an apparatus or system that receives a data stream in a first multimedia data format detects the capability of a connected device, the apparatus or system providing the received data stream to the connected device if the connected device is capable of accepting the first multimedia data format, and providing a modified data stream in a second multimedia data format if the connected device is incapable of accepting the first multimedia data format.

In some embodiments, an apparatus or system receiving a data stream in a first multimedia data format inserts a replacement data portion into the received data stream to generate a modified data stream in a second multimedia data format.

In some embodiments, an apparatus or system generates replacement data to substitute for a data portion of the received data stream in the generation of the modified data stream. In some embodiments, the generated data is dummy data generated for the purpose of allowing acceptance of the second data stream by a device that is incapable of accepting data in the first multimedia data format. In an example, the generated data is a generated video portion without any meaning or connection with the received data stream.

In an example, an HDMI processing element, which may be port processors or other types of devices or systems, has one or more HDMI receive ports and one or more HDMI transmit ports. In an operation, selected receive and transmit ports are used to handle a particular chosen HDMI data stream. In some embodiments, a device accepts data in a certain first multimedia data format and converts such data into a form that is accepted by a connected sink device that is not compatible with the first multimedia data format. For example, an HDMI port processor is operable to accept one or more newer HDMI data formats, and convert the received data into a data format that can be accepted by a connected legacy HDMI sink device. In an additional example, Display-Port is another interface standard to which an embodiment of a method may apply.

A device, such as a television, receiving a data stream may be connected with another device (which may be referred to as a connected device) that may utilize the data stream. The connected device may be a device such as a sound bar to reproduce the audio portion of the signal, another television unit, an AV (audio video) receiver, or other device utilizing multimedia data. In some embodiments, an apparatus or system, such as a 3D television having a port processor or other processing element under firmware control, receiving a 3D multimedia data stream may access data regarding the capability of a connected sink device to determine what multimedia data format is to be sent to the connected device. In an example, firmware of the apparatus or system may access the EDID (Extended Display Identification Data, which may also include E-EDID, Enhanced Extended Display Identification Data) in a connected device. In some embodiments, the apparatus or system reads the EDID to determine 3D capability of the connected device, and utilizes such knowledge to determine the nature of data that is sent to the connected device.

In some embodiments, if an apparatus or system receives a 3D multimedia data stream and determines that a connected device is 3D capable, then the apparatus or system may send the unmodified 3D HDMI stream to the 3D capable connected device, while displaying the 3D image on its own internal panel. In some embodiments, if the apparatus or system determines that the connected device is not 3D capable, the apparatus or system sends a modified data stream, such as the 3D data stream converted to a 2D (two-dimensional) HDMI stream, to the non-3D capable connected device, while displaying the 3D image on its own internal panel.

In some embodiments, an apparatus or system is connected to a connected device that is utilized to reproduce the audio signal of a data stream, and thus the connected device does not need to utilize the video portion of the data stream. In some embodiments, when the original format of a data stream cannot be accepted by the connected device, the apparatus or system converts the data stream such that only the video portion of the data stream is be altered, while still transporting the unaltered audio and other embedded information to allow usage by the connected device.

In an example, digital audio and digital video (such as HDMI data) may be encoded onto a TMDS (Transition Minimized Differential Signaling) link, with the cable connection being a single HDMI cable. The HDMI cable further includes a Display Data Channel (DDC), the DDC being a communication channel based on the I²C (Inter-Integrated Circuit) computer bus specification. HDMI includes support for the Enhanced Display Data Channel (E-DDC), which is used by the HDMI source apparatus or system to read the EDID data from the connected HDMI sink device to determine what audio/video formats the connected device supports. In some embodiments, the EDID of television may be altered to match the audio capability of the connected device, while indicating the video capability of the television.

In some embodiments, a system or apparatus may utilize high speed video rate (14 to >300 MHz) digital logic to separate a digitally encoded media stream into digital audio and video data in order to replace the video data with a generated video carrier that is compatible to the media standard for devices that are of limited video standard compatibility (such as, for example, legacy HDMI devices that are not capable of 3D operation, Deep Color utilization, or operation that is faster than 150 MHz).

In some embodiments, an apparatus or system includes a data generator to generate a replacement data stream for insertion in a modified data stream for connected devices that are not capable of receiving the original format of the data stream. The data generator may vary in different embodiments, depending on the needs of operation. In an example of replaced video data, a video data generator may be as simple as a static test pattern if, for example, the video data portion is not important because the audio portion of a multimedia signal onward is the only portion utilized by a connected device. In some embodiments, a data generator may be more complicated if the replaced data portion of a multimedia data stream is to be utilized. For example, a video data processor may include a processor for 3D to 2D full motion image conversion, or a video processor for 4k×2k resolution conversion to 1080p or Deep Color to standard color conversion. In some embodiments, one or more other portions of a received multimedia data stream, such as the audio and other embedded HDMI data of an HDMI data stream, are preserved and transported to the connected HDMI device with the generated video.

In some embodiments, a device may be implemented in a port device or system utilizing two transmitters for the transfer of data. For example, a first transmitter may operate as an HDMI interface to provide HDMI 1.4a or other future video formats for display and a second transmitter may operate as an HDMI interface to carry audio to a legacy device, such as a legacy sound bar or AV receiver, or a television or other multimedia device receiving an HDMI signal.

In some embodiments, a port device or system further allows the insertion of external audio sources onto a received HDMI stream. In some embodiments, a device or system receiving a multimedia data stream, such as an HDMI data stream, allows acceptance of audio from another audio source and inserts this audio in place of the audio of the selected HDMI source stream or onto an internally generated HDMI source. In some embodiments, a device or system may utilize a second transmitter as an HDMI interface to carry audio to a sound bar when, for example, the television is not using an HDMI source (such as when the television is presenting data received from a terrestrial tuner or external media input). In some embodiments, the device or system allows a connected device, such as a sound bar or AV receiver, to receive audio via the HDMI transmitter, while the HDMI sources available to the device or system are not the media that the television is currently presenting. In some embodiments, device or system further allows the selected audio source to be used internally in the television or other presentation device.

FIG. 1 is an illustration of a system for conversion of multimedia data stream format. In this illustration, a presentation device 100, which may include a television receiver or other apparatus or system for the presentation or other use of multimedia data, receives one or more multimedia data streams 150. The presentation device 100 utilizes or chooses one of the multimedia data streams, where the chosen multimedia data stream is in a first data format, where the first data format may be a newer data format in comparison with a second data format. Further, the presentation device 100 may be coupled with one or more devices, wherein a connected device 130 may be a legacy apparatus or system that is capable of utilizing multimedia data in the second data format but is incapable of accepting the first data format. The connected device may be a device such as a sound bar, AV receiver, television, or other similar multimedia apparatus or system.

In some embodiments, the presentation device 100 may include a multimedia data processor apparatus or system 110, wherein the processor is operable to receive the multimedia data stream 150; provide the data stream in its original format (in the first data format) to an element for presentation or other use, illustrated as a data device 120 (such as a display for the presentation of a video portion of the multimedia data stream); and provide a modified data stream with a replaced data portion 125 (in the second data format) to the connected device 130. For example, the processing apparatus or system 110 may present 3D video content from the data stream 115 on the display. In this example, the connected device 130 may be a device for the presentation of the audio portion of the received multimedia data stream 150, but the connected device 130 may be incapable of handling multimedia data in the 3D data format and thus cannot obtain the audio data from the data stream 115 provided to the data device 120. While this particular example includes the replacement of video data for use of data by a connected audio device, embodiments may include the replacement of any data portion of a received data stream for the use of a connected device.

In some embodiments, the multimedia data processor 110 receives the multimedia data stream in the 3D data format and, in addition to providing the data stream 115 to the data device 120, generates or obtains a replacement data element, inserts the replacement video data stream in place of the original 3D video data, and provides the generated data stream with replaced video portion 125 to the connected device 130. In this example, the connected device 130 is able to process the generated data stream 125 and may, for example, obtain the audio data portion from the generated data stream 125 for presentation.

Figure 2:
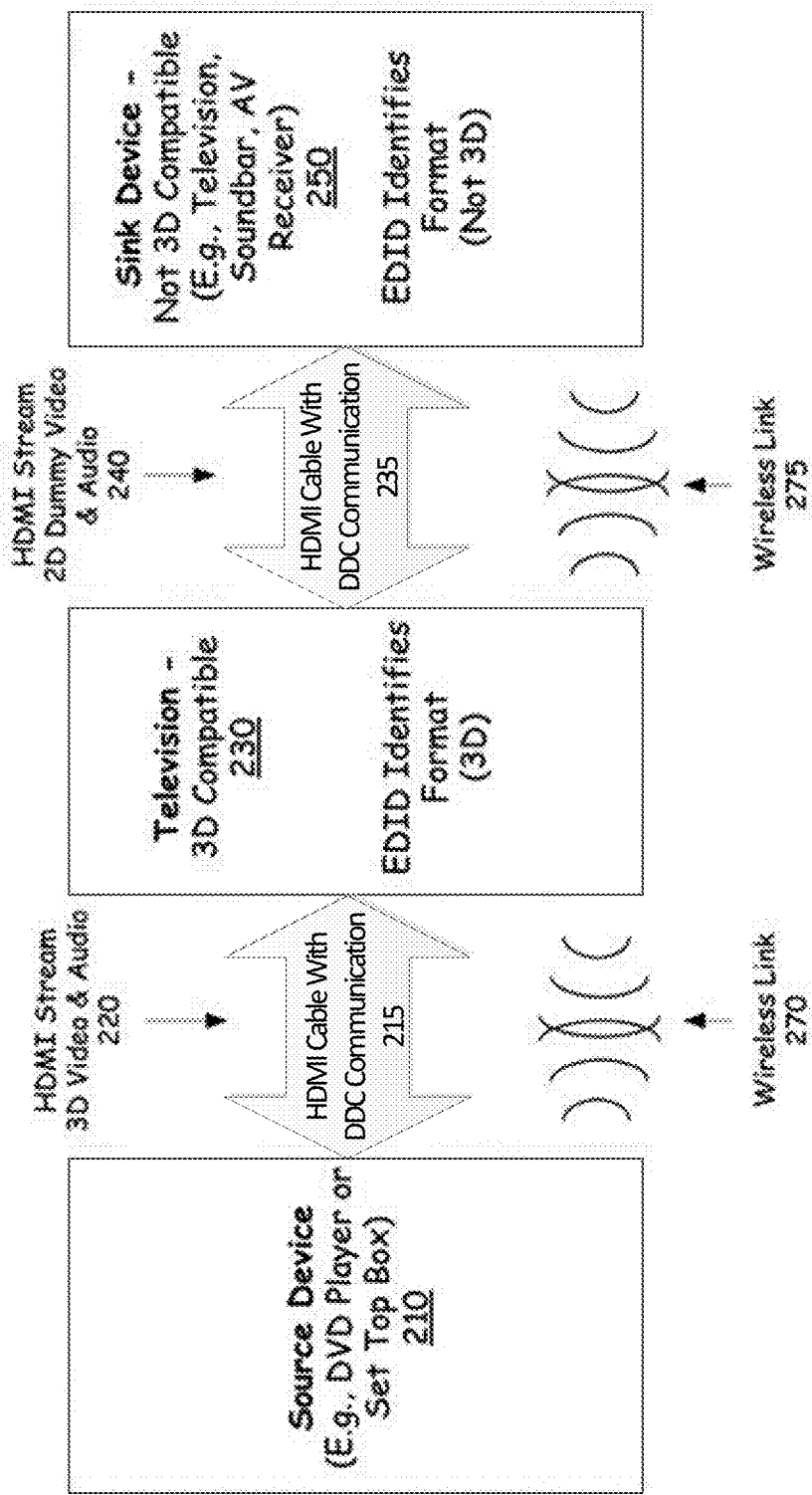
FIG. 2 illustrates an embodiment of conversion of multimedia data stream format for use by connected devices.

FIG. 2 illustrates an embodiment of conversion of multimedia data stream format for use by connected devices. In this illustration, a multimedia data source device 210 is coupled with a television or other presentation device 230 by a cable, such as a first HDMI compatible cable 215. The source device 210 may be, for example, a DVD or Blu-ray player or a set top box that receives cable, satellite, or other data source. The television 230 is further coupled with a connected sink device 250 by a second HDMI compatible cable 235. As shown, the cables 215 and 235 include DDC (Display Data Channel) communication. The connected device may be, for example, another television, a sound bar, or an AV receiver. In this example, the source device 210 and television 230 may be 3D capable, but the connected device 250 is not 3D capable. While this illustration provides for connection by cables 215 and 235, embodiments are not limited to any particular kind of connection. In some embodiments, the devices may include wireless transmitters and receivers and may be connected by one or more wireless links (or a mixture of wireless and wired links), with the wireless links illustrated as a first wireless link 270 between the source device 210 and the television 230 and a second wireless link 275 between the television 230 and the connected device 250.

In some embodiments, the source device 210 provides an HDMI data stream, such as a 3D data stream 220 under HDMI Version 1.4a, to the television 230 via the HDMI cable 215. The television 230 may utilize the 3D data, including the presentation of the 3D video data on a display screen, However, the television 230 is connected with a non-3D sink device 250 that is incapable of utilizing the 3D data. In some embodiments, the television 230 operates to detect the data format capability of the connected device 250. In some embodiments, in addition to the source device 210 determining that the television 230 is 3D compatible television through use of the EDID received from the television, the television 230 may determine that determine that the connected device is not 3D compatible through use of the EDID received from the connected device 250. In some embodiments, in response to the detection of the lack of 3D capability of the connected device 250, the television modifies the received 3D HDMI data stream to remove the video stream and replace the removed data stream with a 2D video stream, such as a dummy 2D video stream, and transmits the modified HDMI data stream 240 to the connected device 250. The 2D compatible connected device 250 then is capable of accepting and utilizing the received 2D HDMI data stream 240, and may, for example, utilize the audio portion of the 2D data stream 240 to provide the audio portion to accompany the 3D video presented by the television 230.

Figure 3:
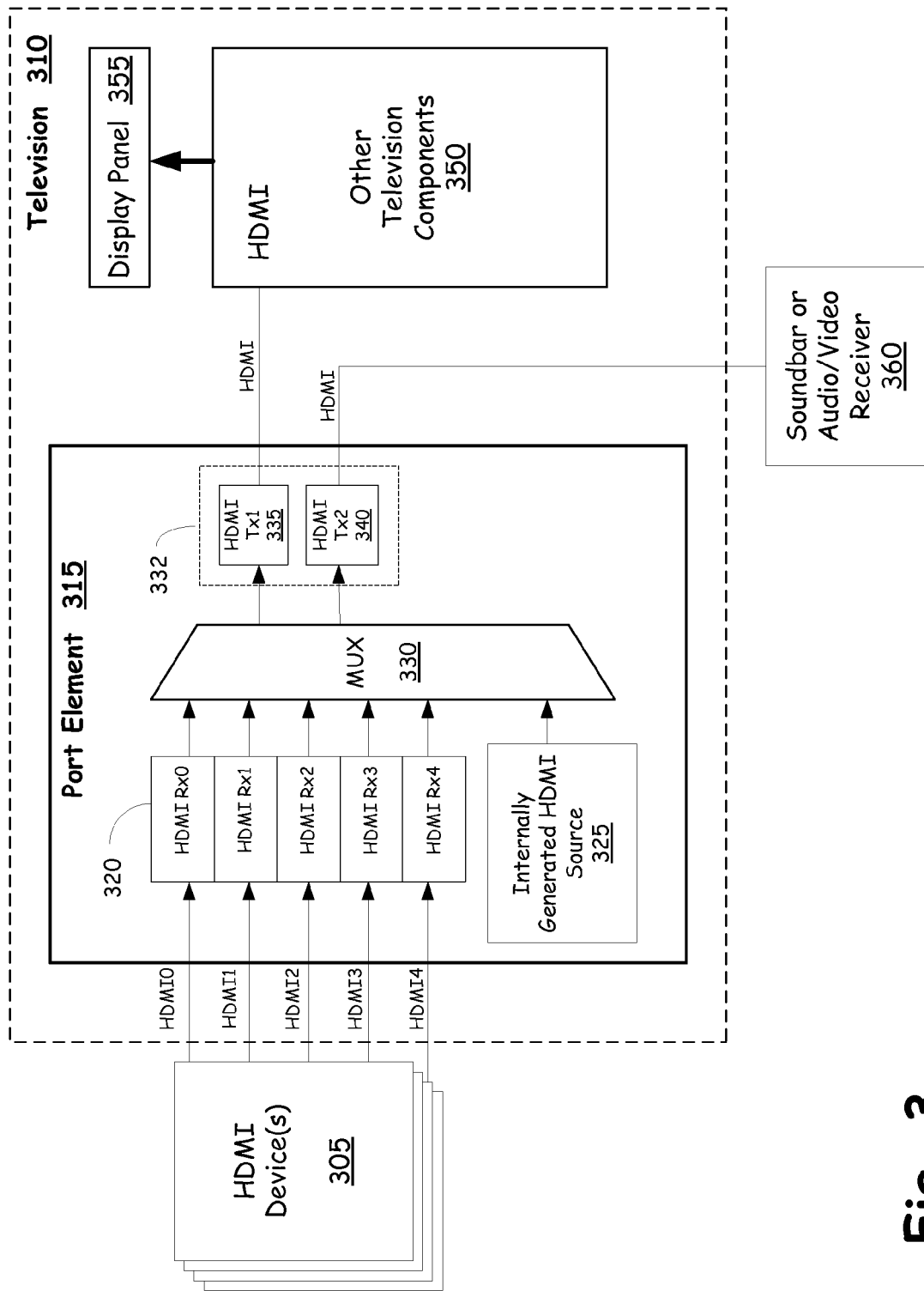
FIG. 3 illustrates an embodiment of a system for converting data formats of multimedia data streams for use by connected devices.

FIG. 3 illustrates an embodiment of a system for converting data formats of multimedia data streams for use by connected devices. In this illustrated example, one or more HDMI source devices 305 are coupled with an HDMI receiving device 310. In this illustration, the receiving device is a television or other multimedia presentation device 310, but embodiments may include any device capable of receiving and handling the multimedia data, including, for example, an A/V receiver or other device. The television 310 may in turn be coupled with one or more other multimedia devices 360, such as a sound bar or A/V receiver 360. While FIGS. 3 and 4 and the related discussion generally refer to the sound bar or A/V receiver as an example, embodiments are not limited to such devices, and the one or more connected multimedia devices may further include a television or other multimedia device.

In some embodiments, the television 310 includes a port element 315 (which may be a device, chip, or system, including, for example, a port processor) that operates to receive and handle multimedia data, including the receipt and handling of HDMI data from the HDMI devices 305, shown in FIG. 3 as connections HDMI0, HDMI1, HDMI2, HDMI3, and HDMI4. In this illustration, the port element 315 includes receivers for the receipt of the multimedia data, shown as a plurality of HDMI receivers 320 (includes receivers HDMI Rx0 through HDMI Rx4 in this illustration). In some embodiments, the port element 315 further includes a multiplexer 330 that receives the HDMI input data streams as well as the output of an internally generated HDMI source 325.

In some embodiments, the port element 315 includes transmitters 332, the transmitters in this illustration including at least two HDMI transmitters, illustrated as HDMI Tx1 335 and HDMI Tx2 340, where HDMI Tx1 335 presents an HDMI multimedia data stream chosen by the multiplexer 330 to the other television components 350 (including commonly known components for the handling of video data) for presentation on, for example, a display panel 355. In some embodiments, HDMI Tx2 340 operates to present an HDMI data stream to the sound bar or A/V receiver 360.

In operation, an HDMI source device 305 may provide a data stream in a first data format (such as a 3D HDMI data stream). In this illustration, the television 310 is compatible with the first multimedia data format, but the sound bar or A/V receiver 360 is not compatible with the first multimedia data format. However, the sound bar or A/V receiver 360 is compatible with a second multimedia data format, where the second data format may be a legacy multimedia format (such as a 2D HDMI data stream). In some embodiments, the port element 315 operates to detect the data capability of connected devices. In some embodiments, the port element 315 operates to convert a multimedia data stream in the first multimedia data format into a data stream in the second multimedia data format. In some embodiments, the port element 315 operates to replace a video data portion of a received multimedia data stream with replacement video data, such as a video data stream generated by the internally generated HDMI source 325. In some embodiments, the generated video data is dummy data without actual meaning or relation to the content of the received data stream, while in other embodiments the generated video data may be data converted to a 2D format. With the receipt of the data in second multimedia data format, the sound bar or A/V receiver 360 is able to utilize the received data, including the use of such data for the presentation of audio data to accompany the presentation of the video data by the television 310 on the display panel as well as the use of the video in the case of converted (non-dummy) video 355.

Figure 4:
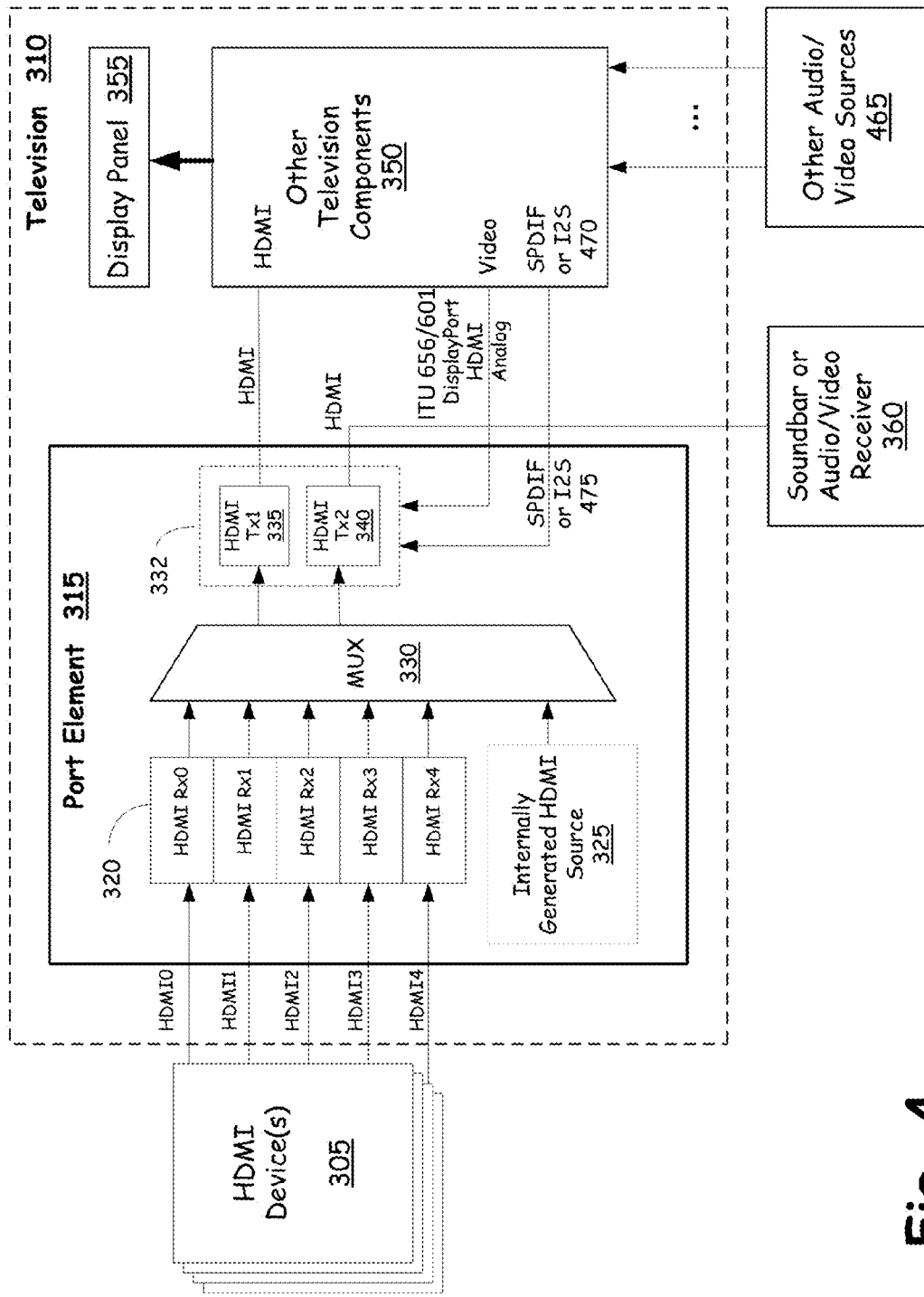
FIG. 4 illustrates an embodiment of a system for converting data formats of multimedia data streams for use by connected devices.

FIG. 4 illustrates an embodiment of a system for converting data formats of multimedia data streams for use by connected devices. In addition to the elements illustrated in FIG. 3, the television may further be coupled with other multimedia elements, such as other audio or video sources 465, where multimedia data is received by, for example, the other components 350 of the television 310. In some embodiments, the received data from the other audio or video sources is non-HDMI data, and the television operates to convert the non-HDMI data into a format that is usable by the HDMI-connected sound bar or A/V receiver 360.

In some embodiments, the television components 350 may provide received digital audio data from the other audio or video sources 465 to port element 315, such as via a S/PDIF (Sony/Philips Digital Interconnect Format) or I2S (Inter-IC Sound or Integrated Interchip Sound) (also referred to as I²S) interface 470 of the other components to the S/PDIF or I2S interface 475 of the port element 315. In some embodiments, the television components 350 may also provide other received video data signals from the other audio or video sources 465 to the port element 315. As illustrated in FIG. 4, such video signals may include data such as ITU-R (International Telecommunication Union Radiocommunication Sector) BT.601/656 (also referred to as ITU 601 or ITU 656) video, HDMI video, DisplayPort video, and analog video.

In some embodiments, the received audio data from the other audio or video sources 465 may be mixed with generated video data from the internally generated HDMI source 325 at the HDMI Tx2 transmitter 340 to generate an HDMI data stream in a format usable by the sound bar or A/V receiver 360, thereby allowing audio data from other sources to be presented via the HDMI connected sound bar or A/V receiver 360. In some embodiments, audio data may also be inserted over the original HDMI stream of device(s) 305. In some embodiments, the other television components 350 may also provide video data to port element 315 and that video could be used to replace the video from HDMI stream of device(s) 305

Figure 5:
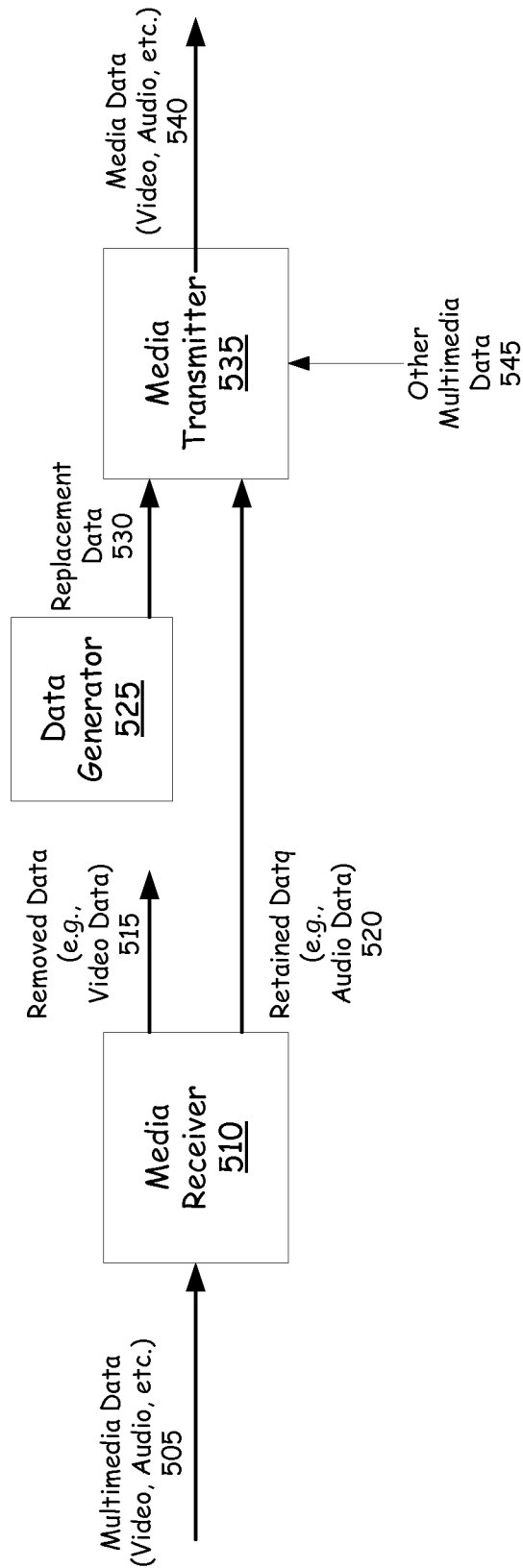
FIG. 5 illustrates an embodiment of conversion of multimedia data streams for use by connected devices.

FIG. 5 illustrates an embodiment of conversion of multimedia data streams for use by connected devices. In some embodiments, a multimedia data stream (which may include video, audio, or other data) 505 is received by a media receiver 510, where the media receiver 510 removes a data element (such as, for example, a video data element) 515 of the data stream 505 (which may be in a first multimedia data format, such as 3D format), while retaining other data elements (such as, for example, audio data) 520. In some embodiments, other data elements, such as control data or metadata elements, may also be retained.

In some embodiments, the retained data 520 is received by a media transmitter 535, where the media transmitter 535 also receives replacement data 530 (which may be in a second multimedia data format, such as, for example, 2D format) from a data generator 525. In some embodiments, the media transmitter utilizes the generated data 530 and the retained data from the original multimedia data 505 to generate modified media data (which may include video, audio, and other data) 540, where such data is in the second multimedia data format.

In some embodiments, the media transmitter may also receive other multimedia data 545 (such as, for example, additional audio data). In some embodiments, the multimedia transmitter may further utilize the other multimedia data 545, which may be, for example, non-HDMI data, in the generation of the media data 540, thereby allowing the use of the data stream by a connected device connected by an HDMI interface. While this example refers to HDMI for illustration, embodiments are not limited any particular data interface, and may utilize any wired or wireless interface for the transmission of the data, including DisplayPort and other similar multimedia interfaces.

Figure 6:
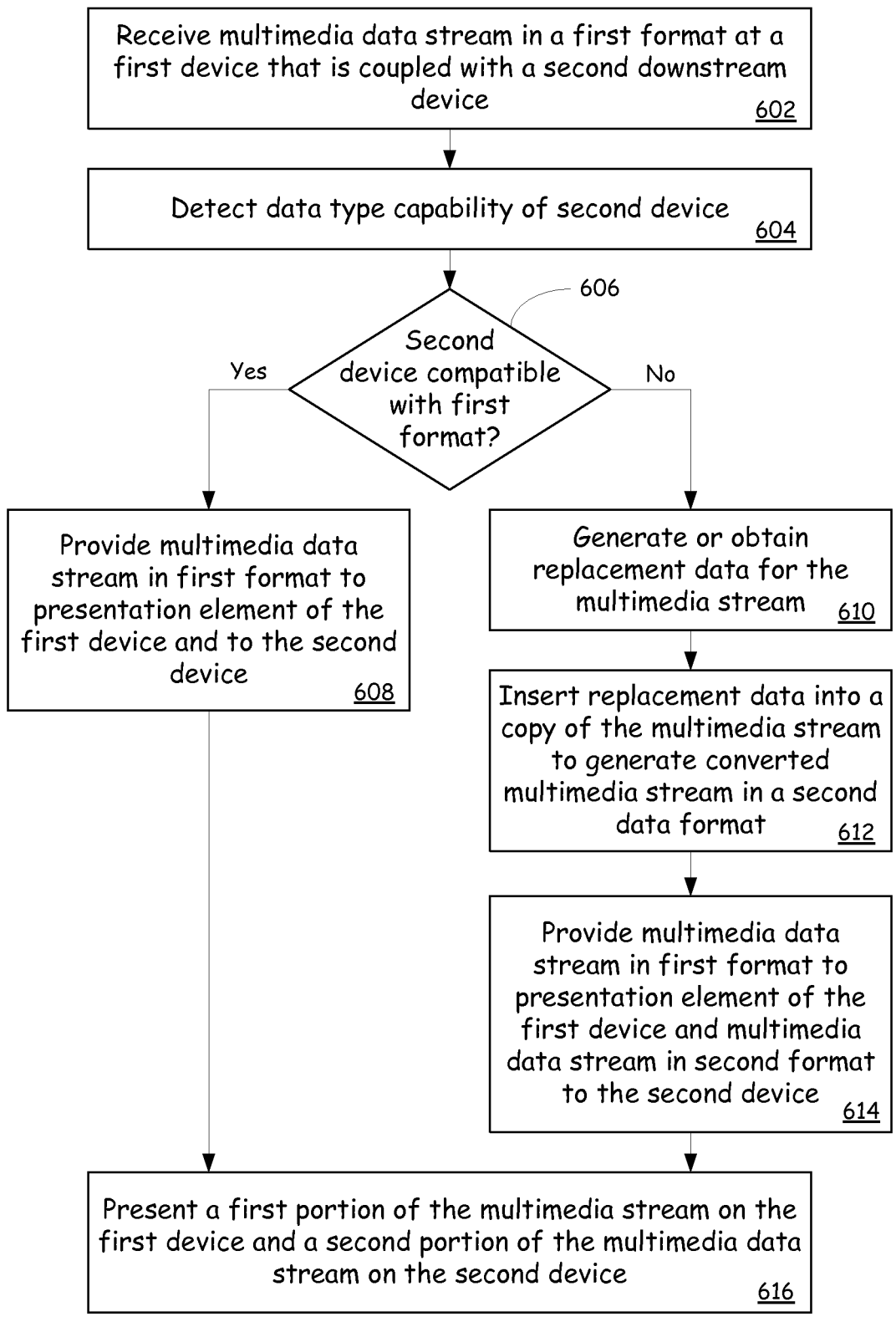
FIG. 6 is a flow chart to illustrate an embodiment of a process for conversion of multimedia data.

FIG. 6 is a flow chart to illustrate an embodiment of a process for conversion of multimedia data. In this illustration, a multimedia data stream (including, for example, video data, audio data, control data, and metadata) in a first multimedia data format (such as, for example, HDMI 3D format) may be received at a first device (which may be, for example, a television or other video presentation device, or other device capable of receiving and handling the received data), wherein the first device is coupled with a second device (which may be, for example, an audio presentation device such as a sound bar or A/V receiver, or may be another device capable of receiving and handling the received data, such as a television) 602. In some embodiments, the data type capability of the second device is detected 604, such as detection by an element of the first device.

In some embodiments, there is determination whether the second device is compatible with the first multimedia data format 606. If the second device is compatible with the first multimedia data format (the "Yes" branch of FIG. 6), then the multimedia data stream is provided in the first multimedia data format to a presentation element of the first device and to the second device 608. If the second device is not compatible with the first multimedia data format (the "No" branch of FIG. 6), then replacement data is obtained or generated for the multimedia data stream 610, and the replacement data is inserted into a copy of the multimedia data stream to generate a converted data stream in a second multimedia data format 612 (such as, for example, 2D HDMI data format). In some embodiments, the multimedia data stream in the first multimedia data format is provided to, for example, a presentation element of the first device and the converted multimedia data stream in the second multimedia data format is provided to the second device 614.

In some embodiments, the multimedia data stream that was originally received may be presented using the first device and the second device 616, such as presenting a first portion of the multimedia stream (such as the original video data) on the first device and presenting a second portion of the multimedia stream (such as the original audio data) on the second device.

However, embodiments are not limited to any particular usage of the multimedia data streams by the devices.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

The invention claimed is:

1. A method for processing data comprising:
    receiving a data stream in a first multimedia data format from a first data source, the data stream comprising HDMI data;
    after receiving the data stream, determining by a first presentation device capable of presenting data in the first multimedia data format to a user at the first presentation device without outputting the data to an external device if a second presentation device coupled to the first presentation device is capable of presenting data in the first multimedia data format;
    responsive to a determination that the second presentation device is incapable of presenting data in the first multimedia data format, generating a modified multimedia data stream in a second multimedia data format by combining 1) a replacement data portion generated by converting a first portion of the data stream to the second multimedia format, 2) a second portion of the received data stream different from the first portion, and 3) non-HDMI data received from a second data source different from the first data source;
    providing, by the first presentation device, the modified multimedia data stream to the second presentation device, the second presentation device configured to present the modified multimedia data stream in the second multimedia data format; and
    presenting, to a user, a portion of the received data stream in the first multimedia data format by the first presentation device and a corresponding portion of the modified multimedia data stream in the second multimedia data format by the second presentation device.

2. The method of claim 1, wherein the received data stream includes a video portion and an audio portion, wherein the first portion of the data stream comprises the video or audio portion.

3. The method of claim 1, wherein generating the replacement video data portion comprises generating a modified version of video data within the first portion of the received data stream.

4. The method of claim 1, wherein the first and second multimedia data formats are HDMI™ (High-Definition Multimedia Interface) or DisplayPort data formats.

5. The method of claim 1, wherein the first multimedia data format is a three-dimensional video format and the second multimedia data format is a two-dimensional multimedia data format.

6. The method of claim 1, wherein the first multimedia data format and the second multimedia data format differ in color depth, clock speed, or picture resolution.

7. The method of claim 1, wherein the first presentation device comprises a first display, wherein the data stream comprises video, and wherein presenting the portion of the data stream comprises displaying the video on the first display.

8. The method of claim 7, wherein:
the second presentation device comprises a second display configured to display 2D video;
the first display is configured to display 3D video;
the received data stream comprises a 3D format;
the modified data stream comprises a 2D format;
displaying the video on the first display comprises displaying the video in 3D; and
presenting the corresponding portion of the modified multimedia data stream comprises displaying the video on the second display in 2D.

9. The method of claim 1, wherein the first presentation device is configured to display video, wherein the second presentation device is configured to play audio and not to display video, wherein presenting the portion of the received data stream comprises displaying video on the first presentation device, and wherein presenting the corresponding portion of the modified multimedia data stream comprises playing audio.

10. An apparatus comprising:
an input configured to receive a first data stream in a first multimedia data format from a first data source, the first data stream comprising HDMI data;
a port element to determine, after receiving the data stream, if a connected device communicatively coupled to the apparatus is capable of presenting data in the first multimedia data format, the apparatus capable of presenting data in the first multimedia data format to a user at the apparatus without outputting the data to an external apparatus;
a hardware processor to, responsive to a determination that the connected device is incapable of presenting data in the first multimedia data format, generate a modified data stream in a second multimedia data format by combining 1) a replacement data portion generated by converting a first portion of the first data stream to the second multimedia data format, 2) a second portion of the received data stream different from the first portion, and 3) non-HDMI data received from a second data source different from the first data source;
a transmitter for transmitting the modified data stream to the connected device; and
a video display to display a portion of the first data stream in conjunction with the presentation of a corresponding portion of the modified data stream by the connected device.

11. The apparatus of claim 10, wherein the replacement data portion is a modified version of video data within the first portion of the first data stream.

12. The apparatus of claim 10, further comprising a multiplexer to choose data streams for the display device and the transmitter.

13. The apparatus of claim 10, wherein the first and second multimedia data formats are HDMI™ (High-Definition Multimedia Interface) or DisplayPort data formats.

14. The apparatus of claim 10, wherein the first multimedia data format is a three-dimensional video format and the second multimedia data format is a two-dimensional multimedia data format.

15. The apparatus of claim 10, wherein the first multimedia data format and the second multimedia data format differ in color depth, clock speed, or picture resolution.

16. The apparatus of claim 10, wherein the non-HDMI data comprises audio data.

17. A non-transitory computer-readable medium having stored thereon data representing sequences of instructions that, when executed by a processor, cause the processor to perform operations comprising:
receiving a data stream in a first multimedia data format from a first data source, the data stream comprising HDMI data;
after receiving the data stream, determining by a first presentation device capable of presenting data in the first multimedia data format to a user at the first presentation device without outputting the data to an external apparatus if a second presentation device coupled to the first presentation device is capable of presenting data in the first multimedia data format;
responsive to a determination that the second presentation device is incapable of presenting data in the first multimedia data format, generating a modified multimedia data stream by combining 1) a replacement data portion generated by converting a first portion of the data stream to the second multimedia format, 2) a second portion of the received data stream different from the first portion, and 3) non-HDMI data received from a second data source different from the first data source;
providing, by the first presentation device, the modified multimedia data stream to the second presentation device, the second presentation device configured to present the modified multimedia data stream in the second multimedia data format; and
presenting, to a user, a portion of the received data stream in the first multimedia data format by the first presentation device and a corresponding portion of the modified multimedia data stream in the second multimedia format by the second presentation device.

18. The medium of claim 17, wherein the received data stream includes a video portion and an audio portion, and wherein the first portion of the data stream comprises the video portion or the audio portion.

* * * * *